S. S. Bent,
App's for Preventing Horses Cribbing.
No 79,437. Patented June 30, 1868.
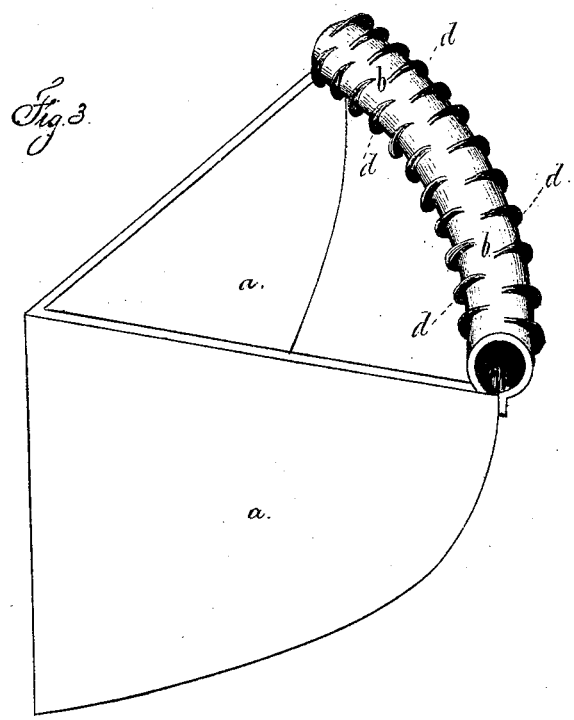

United States Patent Office.

SAMUEL S. BENT, OF PORTCHESTER, NEW YORK.

Letters Patent No. 79,437, dated June 30, 1868.

IMPROVEMENT IN APPARATUS TO PREVENT HORSES CRIBBING.

*The Schedule referred to in these Letters Patent and making part of the same.*

TO ALL WHOM IT MAY CONCERN:

Be it known that I, SAMUEL S. BENT, of Portchester, in the county of Westchester, and State of New York, have invented, made, and applied to use, a certain new and useful Apparatus for Preventing Horses and Mules Biting, Cribbing, or Sucking Mangers or Feeding-Troughs; and I do hereby declare the following to be a full, clear, and exact description of the said invention, reference being had to the annexed drawing, making part of this specification, wherein—

Figure 1 is a plan of a corner manger, fitted with my improvement, and

Figure 2 is a section at the line $xx$ of the roll, placed upon the edge of the manger to prevent cribbing, and Figure 3 is a perspective view of a corner manger fitted with my improvement.

Similar letters denote the same parts.

Many valuable horses acquire the habit of biting, sucking, or cribbing the edge of the manger or feeding-trough, and also the surrounding wood-work, and this habit is not cured by covering the wood with sheet metal, or forming the manger of cast iron, for some horses will seize the parts with the mouth and suck and bite at the same, greatly to their injury, as the habit of biting while in harness is sometimes contracted thereby.

The nature of my said invention consists in a metallic roll or edge to the manger or feeding-trough, formed in such a manner as to be disagreeable to the horse's mouth, and thereby either cure the animal of the habit of biting or cribbing, or prevent or lessen that habit.

In the drawing, I have shown a corner manger, $a$, with a circular edge, but my improvement might be applied to the straight or curved edge of the manger, feeding-trough, or other part.

$b$ is the metallic roll, that sets over the edge of the part to be protected; this is formed of cast iron, and is to be hollow, and secured to the parts by the bolts $c$, or similar means.

This roll may be cylindrical, as shown, or partially prismatic in its surface, and it extends around the edge of the manger or article to be protected, in such a manner that there is no edge or angle, as shown, against which the horse can set his teeth. This rolled edge cannot be grasped in a horse's mouth, and held on to in consequence of both its shape and size, say about three inches in diameter.

As an additional precaution, I make use of narrow-edged ribs $d$, running around or partially around said roll $b$, either in a straight or diagonal direction, which ribs are disagreeable to the horse's lips and teeth, by presenting a somewhat sharp edge to the lips, and passing in between the teeth if taken by them.

In consequence of the disagreeable character of this roll to a horse's or animal's mouth, he is prevented from sucking, biting, or cribbing the manger or feeding-trough, and thereby either wholly or partially cured of this habit, or prevented from acquiring it.

It will be evident that my improved roll might be cast with the manger, or other article to be protected, and that the said roll may be either hollow or solid.

What I claim, and desire to secure by Letters Patent, is—

The metallic roll for the edges of feeding-troughs or mangers, formed substantially as specified, for preventing horses biting or cribbing, as set forth.

In witness whereof, I have hereunto set my signature, this eleventh day of May, 1868.

<div style="text-align:right">SAMUEL S. BENT.</div>

Witnesses:
CHAS. H. SMITH,
GEO. T. PINCKNEY.